United States Patent [19]

Severinsky

[11] Patent Number: 5,458,991
[45] Date of Patent: Oct. 17, 1995

[54] UPS WITH AUTO SELF TEST

[75] Inventor: Alex J. Severinsky, Silver Spring, Md.

[73] Assignee: SL Waber, Inc., Mt. Laurel, N.J.

[21] Appl. No.: 63,313

[22] Filed: May 19, 1993

[51] Int. Cl.⁶ .................................................. H01M 10/48
[52] U.S. Cl. .................................................. 429/61; 307/66
[58] Field of Search .................................. 429/61, 90, 92; 290/50; 307/66, 67

[56] References Cited

U.S. PATENT DOCUMENTS

| | | | |
|---|---|---|---|
| 4,203,041 | 5/1980 | Sachs | 307/67 |
| 4,354,118 | 10/1982 | Spencer | 307/66 |
| 4,583,004 | 4/1986 | Yearsin | 307/66 X |
| 5,130,562 | 7/1992 | Freymuth | 307/66 |
| 5,156,928 | 10/1992 | Takabayashi | 429/61 X |
| 5,206,538 | 4/1993 | Orta | 307/66 |

*Primary Examiner*—Stephen Kalafut
*Attorney, Agent, or Firm*—Banner & Allegretti, Ltd.

[57] ABSTRACT

An uninterruptible power supply (UPS) is disclosed in which AC line power is used to charge a back-up battery and to operate a load during a stand-by mode of operation of the UPS. In the back-up mode of operation when AC line power is not available, the battery is used to supply power to the load. The UPS automatically tests the load and the battery when the AC line power is available to assure availability of back-up power in case of a failure of the AC power. The results of the test is displayed to the user.

12 Claims, 2 Drawing Sheets

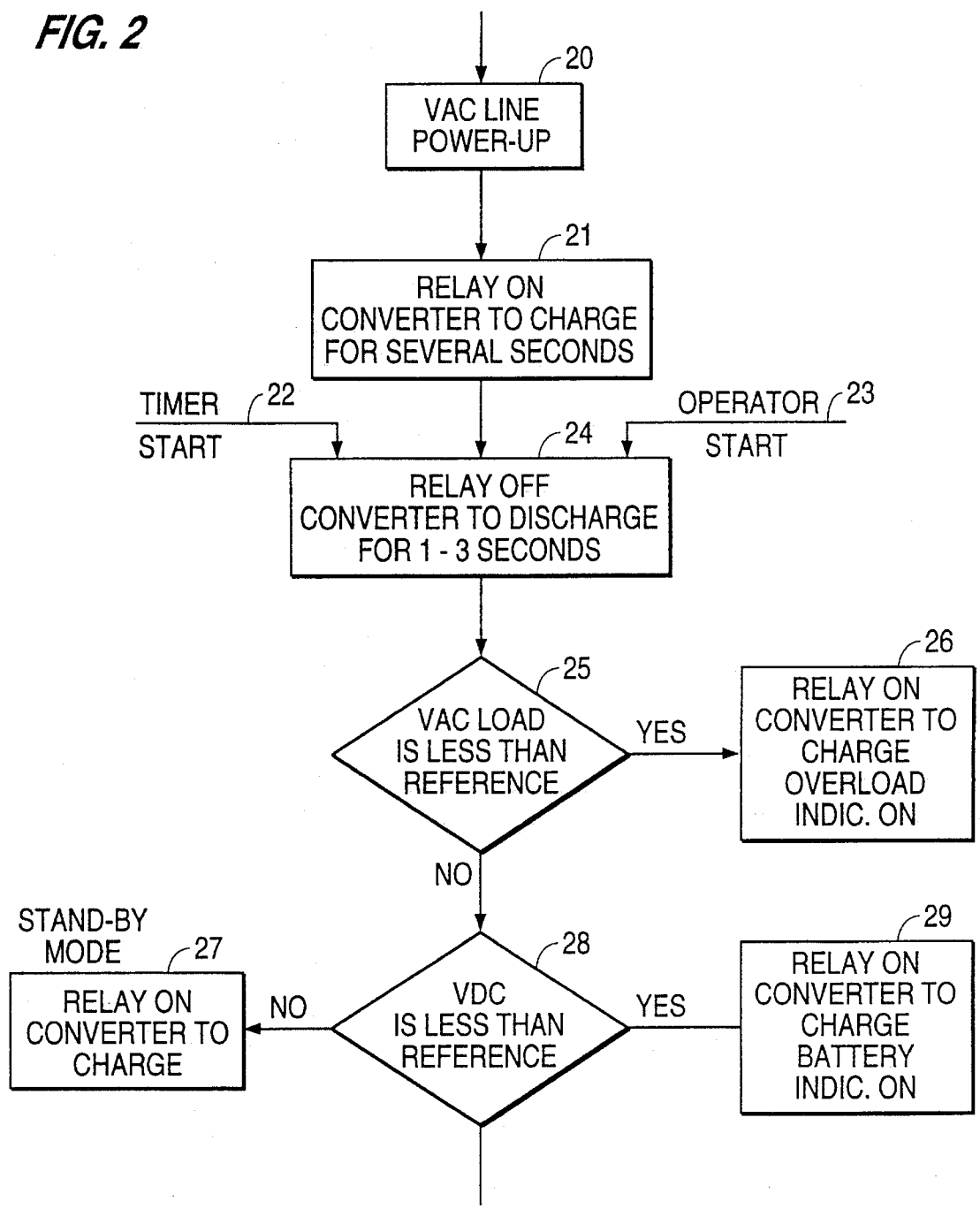

UPS WITH AUTO SELF TEST

BACKGROUND OF THE INVENTION

This invention generally relates to the field of stand-by uninterruptible power supplies (UPS). More particular, the invention is directed to a stand-by UPS which automatically tests its load and its battery when electric utility power is available to assure availability of power in case of power failure of the electric utility.

The present invention differs from the prior art in a number of ways, including the fact that the load and the battery are tested without losing power to the load and the battery is tested rapidly and instantaneously. The test of the present invention does not require a complete test of battery discharge time.

The current state-of-the-art in load and battery testing is reflected in the design of a typical stand-by UPS made by American Power Conversion Corp. (APC), in particular, APC's Back-Up series of products with power ratings from 250 to 600 VA. To test that the load is within the rating of the APC UPS, the design forces the operator to either unplug the UPS from the source of utility power or depress a manually operated pushbutton switch. Both of these actions will force the UPS to power the load from the internal backup battery. It is then left to the operator to determine if the load operates normally. What is normal operation is not always readily determinable. One clear indication of abnormal operation, however, is a shutdown. In such a situation, the operator crashes the load electrically. Thus, the operator assumes all the risk of misjudging the suitability of load to the APC UPS. To test the battery in the APC design, it is required to recharge the battery for over 12 hours, then disconnect the UPS from the electric utility power line and allow the UPS to discharge the battery while powering the load. It is then left to the operator to decide if the battery capacity is adequate for the application. Thus, there is no objective testing in the APC design. If the duration of the operation of the load is outside of the operator's expectations, there are numerous reasons for the cause to appear as an overload, including a bad battery charger, bad inverter, bad connections, and an exhausted battery. The operator is forced to replace the battery without having any confirmation that it is the cause of inadequate performance. Also, the operator must place the load in an inactive status to conduct the test in order to avoid possible damage to data during a sudden unexpected power interruption.

The disadvantage of the required testing in the APC UPSs is that operators forget to conduct the tests and learn of either overload or a bad battery at the worst possible time, i.e., when a utility power outage happens and the UPS can not power the load and the load crashes.

SUMMARY OF THE INVENTION

It, is therefore, the overall object of the present invention to provide an uninterruptible power supply which overcomes the drawbacks and disadvantages of uninterruptible power supplies known in the prior art.

The present invention provides a UPS apparatus allowing objective testing of both the load and the battery. The test is conducted automatically in order to assure continuity of power to the load during power outages and without interrupting power flow to the load.

The above and other objects and features of the invention will become apparent from the following description read in conjunction with the accompanying drawings.

BRIEF DESCRIPTION OF THE DRAWINGS

FIG. 2 shows a logic flow diagram of the UPS sequencer performing a self test in accordance with the present invention.

DESCRIPTION OF THE PREFERRED EMBODIMENTS

Figure 1:
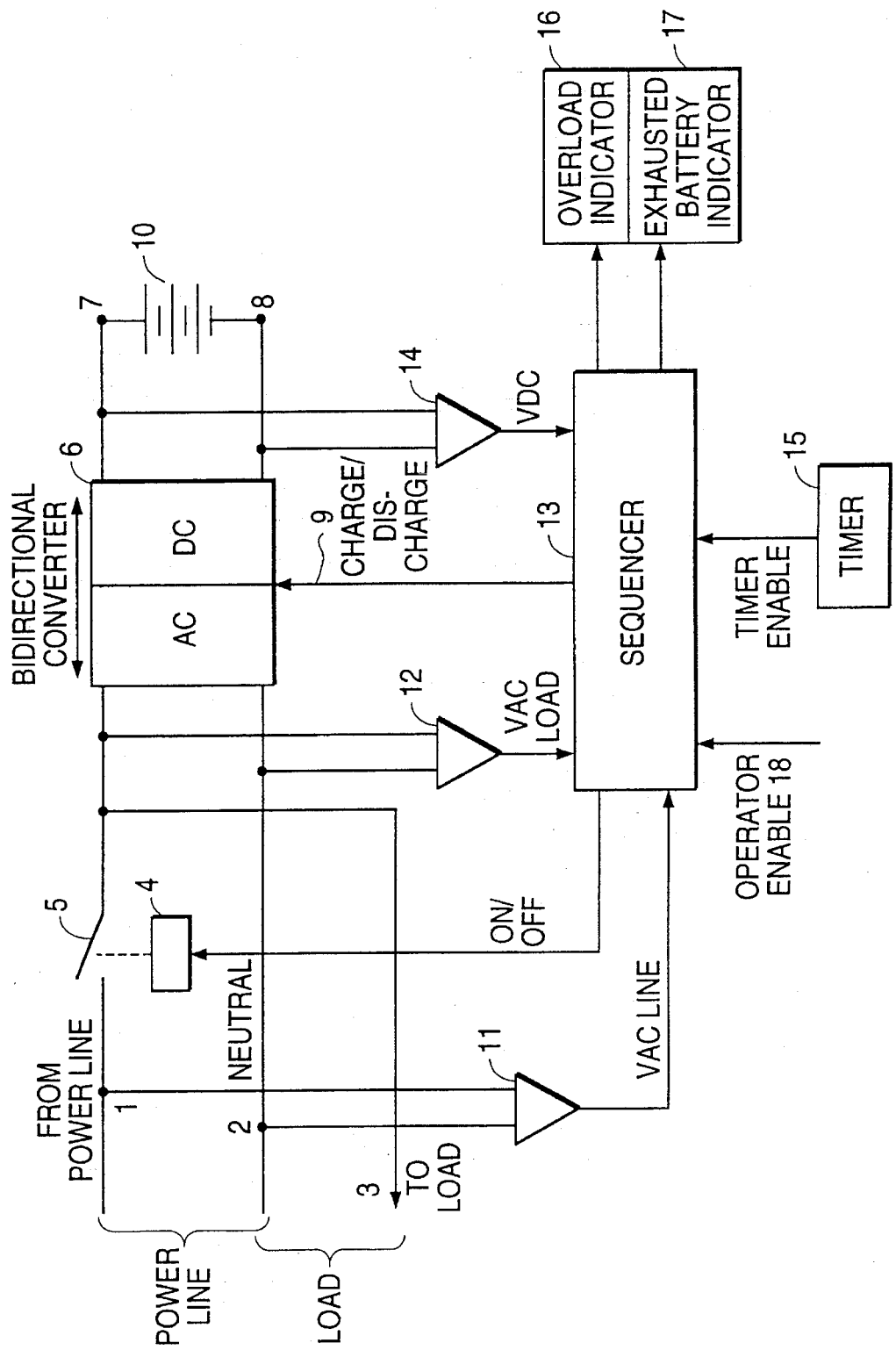
FIG. 1 shows a functional diagram of a UPS with automatic self test in accordance with the present invention.

With reference to FIG. 1, the UPS of the present invention includes a pair of input terminals 1, 2 and a pair of output terminals 3, 2, with terminal 2 being a shared neutral. The input terminals serve the purpose of connecting the UPS to a utility power line and the output terminals are provided for connecting the UPS to a load. A relay 4, with contact 5 in a normally closed position, connects the power line terminals to the load terminals. A bi-directional AC to DC power converter 6 connected to load terminals 1, 2 on the AC side and to a battery 10 with terminals 7 and 8 on the DC side. Converter 6 also has a control input 9 which controls the direction of power flow to charge or discharge battery 10. A signal conditioner 11 is connected to line terminals 1 and 2 on the input and to a sequencer 13 on the output. A second signal conditioner 12 is connected to load terminals 2 and 3 on the input and to sequencer 13 on the output. A third signal conditioner 14 is connected to battery terminals 7 and 8 on the input side and to sequencer 13 on the output. Sequencer 13 receiving signals from signal conditioners 12 and 14 indicating the values of AC and DC voltages on the AC-DC converter terminals, digital signals from the operator or from a timer 15. Sequencer 13 also provides signals to control the position of contact 5 of relay 4 and the direction of the power flow in AC-DC converter 6. Terminal 18 connected to sequencer 13 provides access to the operator or inputting a digital signal. Sequencer 13 also controls the operation of overload indicator 16 and exhausted battery indicator 17. Indicators 16 and 17 provide the test results to the operator.

Power conditioners 11, 12 and 14 serve as signal attenuators and level shifters to make AC and DC signals compatible in amplitude and common mode voltage with sequencer 13 input voltage specifications. There are numerous constructions known in the prior art of attenuators and level shifters which are suitable for this application. In addition, indicators 16 and 17 can be of any usual type or combination, e.g., solid or blinking light indicators, audible alarms, interface signals, etc. Timer 15 can be any device which provides a periodic or random sequence of pulses on the output which can be internally programmed for the desired function of time. There are numerous electronic and mechanical timers known in the prior art which can serve this purpose.

Sequencer 13 is a logic signal processor usually fabricated as a microcomputer. There are numerous programmable microcomputers known in the art which can be used for sequencer 13. The program flow diagram of this sequencer as far as it is related to the described auto testing of the UPS is shown on FIG. 2 and will be discussed further below.

Stand-by Mode Of Operation

In the stand-by mode of operation, the load receives power from the power line and AC-DC converter/inverter 6 of the UPS is in the stand-by mode, ready to provide power to the load if the power line voltage falls outside of the range acceptable for load operation. AC-DC converter 6 charges battery 10 in accordance with a charge signal from sequencer 13. Relay contact 5 is closed by sequencer 13, connecting the power line to the load.

Back-up Mode Of Operation

In the back-up mode of operation, the load receives power from AC-DC converter 6 rather than from the power line. Relay contact 4 is in the open position, thereby disconnecting the load from the power line in accordance with control signals from sequencer 13. AC-DC converter 6 discharges battery 10 and provides power of the appropriate waveform to the load. The output voltage waveform is usually a sinewave, but also can be stepwave, squarewave, or even DC.

Automatic Self Test Mode Of Operation

Initialization Sources

The following are the sources of signals initiating the self test:

a) Power line conditioner 11 provides a signal to sequencer 13 which is proportional to the power line voltage. Sequencer 13 measures this voltage in any way desired, usually its instantaneous values at particular intervals associated with the power line voltage waveform, such as a sinewave. Then, sequencer 13 compares the measured values with boundaries of a band which defines the range of values acceptable for desired load operation. When this measured value of input voltage undergoes a transition into an acceptable range, the sequencer recognizes this transition as initialization of the self test.

b) Timer 15 provides another source of initialization of the self test rather than a transition signal as described above. Timer 15 can be set to initiate a self test periodically, e.g., daily, weekly, or monthly. The self test also can be initiated under external command on a random basis or on demand.

c) Another source of initialization can be the operator enabling the self test via a simple pushbutton switch, or via any interface circuit.

Sequencer Functioning During Self test

The operation of sequencer 13 during a self test will now be described with reference to FIG. 2.

Upon receiving a power-up signal (block 20), sequencer 13 places the UPS in a stand-by mode of operation for several seconds to allow all transition processes in the load to settle. Then, upon one of the three commands received from any initialization sources, the sequencer enters into a self test (blocks 21, 22, 23). It starts by placing the UPS in the Back-up mode of operation.

The first measurement sequencer 13 makes is the value of the output voltage of the AC-DC inverter/converter 6 which powers the load in the back-up mode. It does this by comparing the instantaneous values of the voltage on the output of the signal conditioner 11 connected to the load terminals with internal reference values for each instant of the output voltage waveform as desired (block 25). If this voltage at any desired point, or points, is smaller than the reference, a condition of overload is indicated (block 26).

Because all AC-DC converters are designed for a specific output power, overload always reduces output voltage and therefore, the value of the output voltage is a good indicator of suitability of the converter to power the given load. Upon such detection, sequencer 13 instantaneously places the UPS back in the stand-by mode of operation, locks in this mode by blocking any transfer to the back-up mode until being reset, and activates indicator 16 indicating that the load capacity of the converter is exceeded. Because this also happens when the input power is available, the continuity of power to the load is preserved and load operation is not interrupted.

If there is no overload condition, sequencer 13 proceeds to test battery 10. It measures the voltage on battery 10 via third signal conditioner 14 connected to battery terminals 7 and 8. Sequencer 13 then compares the reference with a set value. This can be a fixed value or a variable depending on the state of the charge of battery 10, load, temperature, etc. If the measured value is smaller than the reference, it indicates that battery capacity is inadequate due to exhaustion. Upon such detection, sequencer 13 will instantaneously place the UPS back in the stand-by mode of operation, locks in this mode by blocking any transfer to the back-up mode until being reset. Sequencer 13 then activates indicator 17 that the capacity of battery 10 is exhausted. Because this also happens under condition that the input power is available, the continuity of power to load is preserved and load operation is not endangered.

If this condition is also not present, then the sequencer places the UPS in the Stand-By Mode of operation, ready to act upon a failure of the power line.

Accordingly, the present invention provides the following benefits:

a) The load is tested objectively by doing electrical measurements;

b) The battery is tested instantaneously regardless of the state of charge;

c) Continuity of power to the load is preserved during testing;

d) The load and battery testing is conducted automatically;

e) Indication of overload or inadequate battery capacity is given while power to the load is available which enables the operator to correct problems in an orderly manner.

The present invention has been illustrated and described in detail in the drawings and foregoing description, it will be recognized that changes and modifications will occur to those skilled in the art. It is therefore intended, by the appended claims, to cover any such changes and modifications as fall within the true spirit and scope of the invention.

I claim:

1. A uninterruptible power supply having a stand-by mode of operation and a back-up mode of operation, said power supply comprising:

input means for receiving input AC power from an AC power source;

output means for providing power to a load;

back-up power means for providing back-up power to said load during said back-up mode of operation;

power switch means coupled to said input means, said output means and to said back-up power means for coupling said AC power to said load during said stand-by mode and coupling said back-up power to said load during said back-up mode; and control means coupled to said power switch means and to said back-up power means for controlling the operating modes of said power supply, said control means including test means for automatically testing the capacity of said back-up power means to meet the power load requirements of said load.

2. An uninterruptible power supply according to claim 1, wherein said control means further includes timing means for providing a timing signal, said automatic testing being in response to said timing signal.

3. An uninterruptible power supply according to claim 2, wherein said timing signal is periodic and regular.

4. An uninterruptible power supply according to claim 1, wherein said control means further includes input command means for inputting a command to said control means, said automatic testing being in response to said command.

5. An uninterruptible power supply according to claim 4, wherein said command means is switch.

6. An uninterruptible power supply according to claim 1, wherein said control means further includes indicator means responsive to said automatic testing for indicating to a user whether said back-up power means has adequate capacity to meet the power requirements of said load.

7. An uninterruptible power supply according to claim 6, wherein said control means further includes reference voltage means for providing a reference voltage and comparison means for comparing the level of the voltage provided by said back-up power means to said reference voltage, said indicator means being controlled in response to said comparison.

8. An uninterruptible power supply according to claim 1, wherein said back-up power means is powered by a back-up battery and said control means further includes indicator means responsive to said automatic testing for indicating to a user whether said back-up battery is sufficiently charged for said back-up power means to provide adequate capacity to meet the power load requirements of said load.

9. An uninterruptible power supply according to claim 8, wherein said control means further includes reference voltage means for providing a reference voltage and comparison means for comparing the level of the voltage provided by said battery to said reference voltage, said indicator means being controlled in response to said comparison.

10. An uninterruptible power supply according to claim 1, wherein said control means controls said power switch means to couple said AC power to said load when said back-up power means does not have adequate capacity to meet the power load requirements of said load.

11. An uninterruptible power supply according to claim 1, wherein said back-up supply is powered by a back-up battery and said control means controls said power switch to couple said AC power to said load when said back-up battery is not sufficiently charged for said back-up power means to provide adequate capacity to meet the power load requirements of said load.

12. An uninterruptible power supply having a stand-by mode of operation and a back-up mode of operation, said power supply comprising:

input means for receiving input AC power from an AC power source;

output means for providing power to a load;

back-up power means for providing back-up power to said load during said back-up mode of operation;

power switch means coupled to said input means, said output means and to said back-up power means for coupling said AC power to said load during said stand-by mode and coupling said back-up power to said load during said back-up mode; and control means coupled to said power switch means and to said back-up power means for controlling the operating modes of said power supply, said control means including test means for automatically testing the capacity of said back-up power means to meet the power load requirements of said load, wherein said automatic testing is in response to a rise in the level of said AC power to a predetermined level.

* * * * *